United States Patent
Fukada

(10) Patent No.: US 8,664,802 B2
(45) Date of Patent: Mar. 4, 2014

(54) WIRELESS ENERGY TRANSFER DEVICE

(75) Inventor: Yoshiki Fukada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 735 days.

(21) Appl. No.: 12/933,264

(22) PCT Filed: Apr. 14, 2009

(86) PCT No.: PCT/IB2009/005225
§ 371 (c)(1),
(2), (4) Date: Sep. 17, 2010

(87) PCT Pub. No.: WO2009/144542
PCT Pub. Date: Dec. 3, 2009

(65) Prior Publication Data
US 2011/0121658 A1    May 26, 2011

(30) Foreign Application Priority Data

Apr. 15, 2008   (JP) ................. 2008-105984
Apr. 15, 2008   (JP) ................. 2008-105996

(51) Int. Cl.
*H01F 27/42*    (2006.01)
(52) U.S. Cl.
USPC ........................................... 307/104
(58) Field of Classification Search
USPC ........................................... 307/104
See application file for complete search history.

(56) References Cited

U.S. PATENT DOCUMENTS

| | | | |
|---|---|---|---|
| 5,991,170 A | 11/1999 | Nagai et al. | |
| 7,068,991 B2 | 6/2006 | Parise | |
| 7,443,057 B2 * | 10/2008 | Nunally | 307/149 |
| 7,522,878 B2 * | 4/2009 | Baarman | 455/41.1 |
| 2004/0130915 A1 | 7/2004 | Baarman | |
| 2006/0113955 A1 | 6/2006 | Nunally | |
| 2007/0145830 A1 * | 6/2007 | Lee et al. | 307/135 |
| 2008/0054638 A1 | 3/2008 | Greene et al. | |
| 2011/0298294 A1 * | 12/2011 | Takada et al. | 307/104 |

FOREIGN PATENT DOCUMENTS

| | | |
|---|---|---|
| EP | 1 022 840 A2 | 7/2000 |
| JP | A-05-091087 | 4/1993 |
| JP | A-10-215530 | 8/1998 |
| JP | A-2006-517778 | 7/2006 |
| JP | A-2006-230129 | 8/2006 |
| JP | A-2008-022429 | 1/2008 |
| WO | WO 2007/084717 A2 | 7/2007 |

OTHER PUBLICATIONS

International Search Report issued in Application No. PCT/IB2009/005225; Dated Sep. 17, 2009.

(Continued)

*Primary Examiner* — Jared Fureman
*Assistant Examiner* — Duc M Pham
(74) *Attorney, Agent, or Firm* — Oliff, PLC

(57) ABSTRACT

A wireless energy transfer device (1) includes: a power transmission unit (2) that generates an oscillating magnetic field or oscillating electric field; a power reception unit (3), which is provided with a receiving antenna (31), and which converts the oscillating magnetic field or the oscillating electric field of the power transmission unit (2) to electric power by the receiving antenna (31); and an electric power theft suppression unit that suppresses the theft of energy with the oscillating magnetic field or the oscillating electric field of the power transmission unit (2).

9 Claims, 8 Drawing Sheets

(56) References Cited

OTHER PUBLICATIONS

Written Opinion of the International Searching Authority issued in Application No. PCT/IB2009/005225; Dated Sep. 17, 2009.

Japanese Office Action issued in Application No. 2008-105984; Dated Jul. 1, 2010 (With Translation).
Japanese Office Action issued in Application No. 2008-105996; Dated Apr. 1, 2010 (With Translation).

* cited by examiner

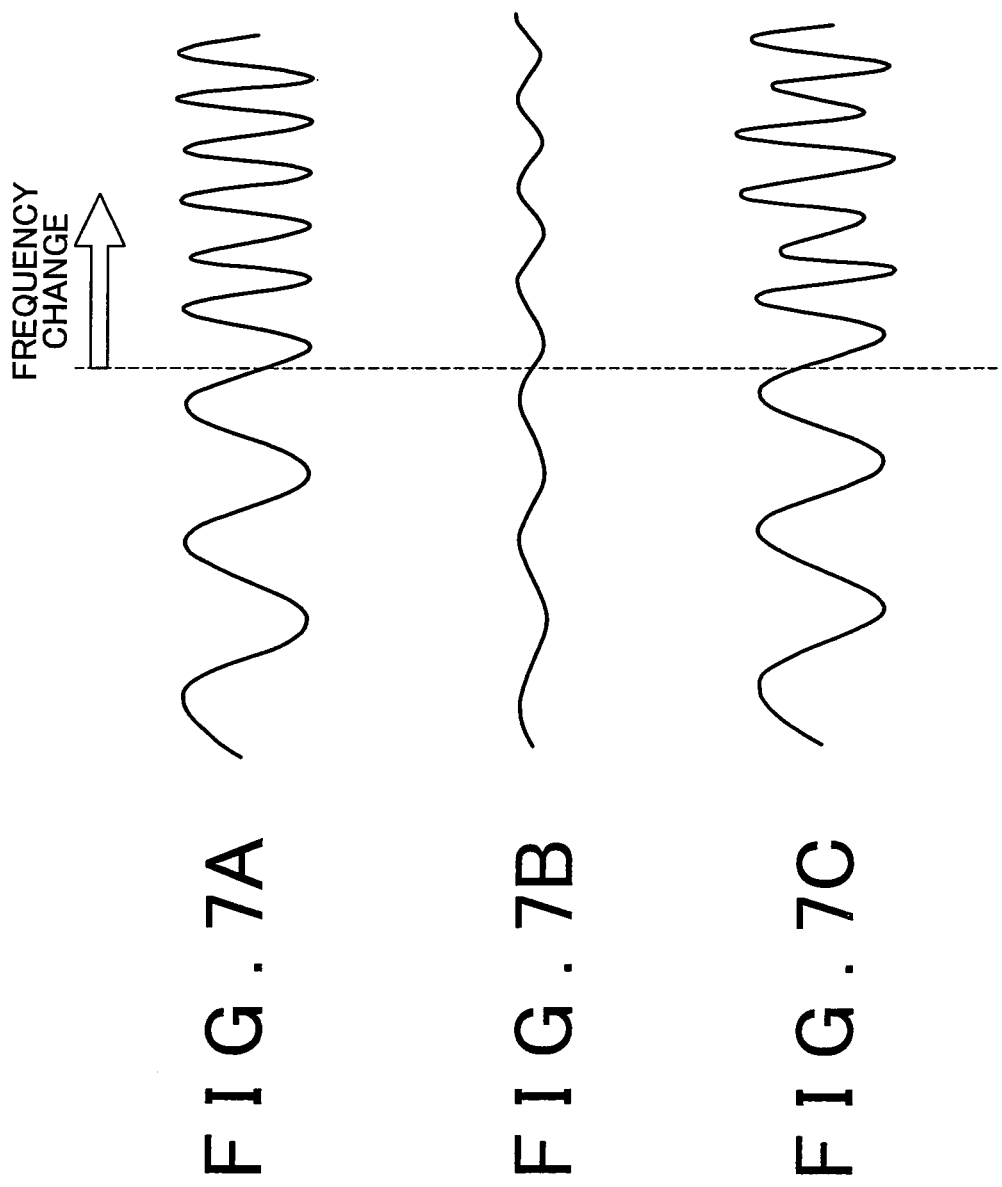

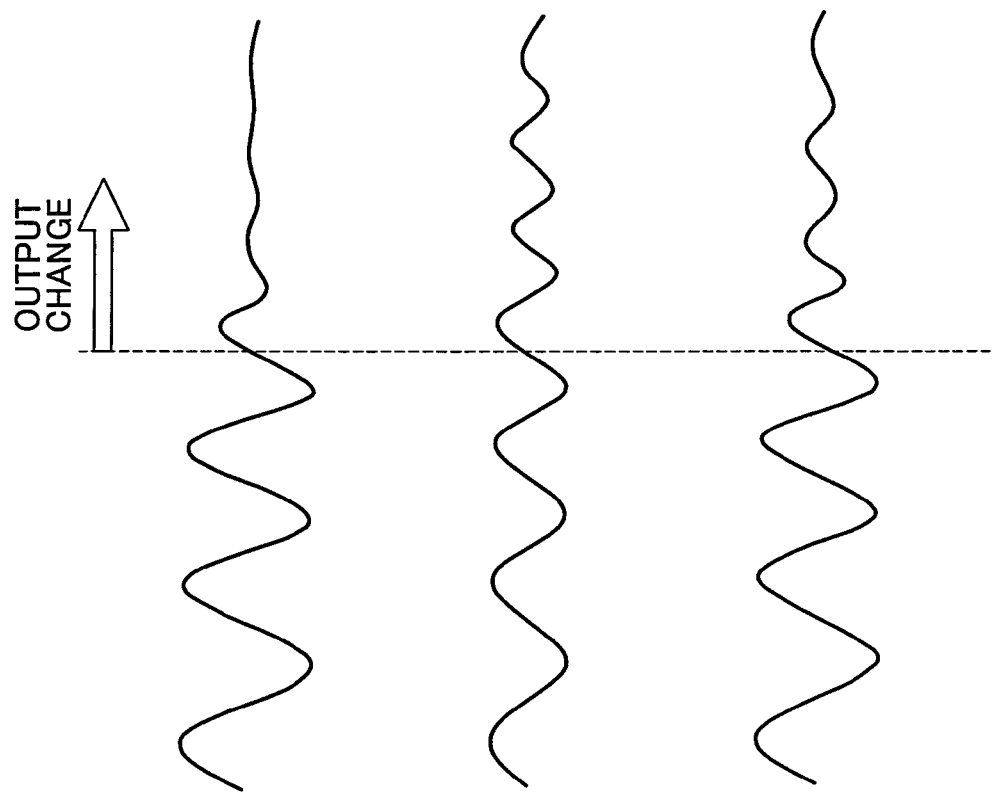

WIRELESS ENERGY TRANSFER DEVICE

BACKGROUND OF THE INVENTION

1. Field of the Invention

The invention relates to an energy transfer device for carrying out wireless transfer of energy without the use of electrical wires and the like.

2. Description of the Related Art

The US 2006/0113955 A1 discloses a wireless charging and power system for electronic devices and a method for communicating power to a power receiver employing wireless energy transmission. The remote charging system includes a power transmission unit which transmits energy as a plurality of constructive transmitted frequencies and a power receiver system that receives the transmitted frequencies. The power receiver is preferably incorporated in a device and includes an energy receptor capable of receiving the wireless transmitted energy and transferring the energy from the transmitted frequencies to an energy storage device included in the device.

The EP 1 022 840 A2 discloses a controller for a battery charger which inductively supplies electrical power for charging a battery in a mobile device. The battery charger includes a self-oscillating power oscillator with at least one separate resonance circuit in the output circuit. The mobile device contains at least one resonance circuit in the inductive coupling section. To detect the coupled mobile device, the controller of the battery charger periodically changes the oscillation frequency of the oscillator during a short test duration and monitors a resulting change in the oscillator operating current. Therefore, any possible changes in the operating current of the oscillator due to the reaction of the resonance circuit of a possibly coupled mobile device is observed to determine the presence of such device.

For example, Japanese Patent Application Publication No. 2008-22429 (JP-A-2008-22429) describes a system for carrying out energy transfer by transmitting electromagnetic waves of a predetermined frequency from a power transmission antenna, receiving the transmitted electromagnetic waves with a receiving antenna and extracting the electric power.

However, this type of wireless energy transfer system has the problem of the energy that is transferred easily stolen. For example, a person desiring to steal energy can receive electromagnetic waves transmitted from a power transmission antenna and steal electric power by preparing an antenna having a predetermined resonance frequency for use as a receiving antenna for stealing electric power and then arranging the receiving antenna for stealing electric power at a predetermined location. In this case, since energy is not being transferred by electrical wires and the like, connection of electrical wires and the like is not required, thereby enabling energy to be stolen easily.

In this case, although it may be possible to detect the theft of electrical power based on whether or not a receiving antenna for stealing electric power is installed, this requires an object detection device that detects the installation of a receiving antenna for stealing electric power, and the detection of the theft of electric power is not easy.

SUMMARY OF THE INVENTION

The invention provides a wireless energy transfer device capable of suppressing the theft of wirelessly transferred energy.

A first aspect of the invention relates to a wireless energy transfer device. This wireless energy transfer device is provided with a power transmission unit that generates an oscillating magnetic field or oscillating electric field; a power reception unit, which is provided with a receiving antenna, and which converts the oscillating magnetic field or the oscillating electric field of the power transmission unit to electric power with the receiving antenna; and an electric power theft suppression unit that suppresses a theft of energy by the oscillating magnetic field or the oscillating electric field of the power transmission unit.

In the aspect described above, the electric power theft suppression unit may also be configured by being provided with a frequency changing unit that changes a frequency of the oscillating magnetic field or the oscillating electric field generated by the power transmission unit, and a first resonance frequency changing unit that changes a resonance frequency of the receiving antenna according to the change in the frequency of the oscillating magnetic field or the oscillating electric field.

According to this configuration, as a result of changing the frequency of the oscillating magnetic field or the oscillating electric field generated by the power transmission unit, it becomes difficult to efficiently receive electric power even when attempting to steal transmitted electric power, thereby making it possible to suppress electric power theft. In addition, by changing the resonance frequency of the receiving antenna according to the change in frequency of the oscillating magnetic field or the oscillating electric field, electric power can be efficiently received even if the frequency of the transmitted oscillating magnetic field or oscillating electric field has been changed, thereby making it possible to properly transfer energy.

The above-mentioned configuration may further be provided with a communication unit that transmits information on the frequency of the oscillating magnetic field or the oscillating electric field generated by the power transmission unit to the first resonance frequency changing unit.

According to this configuration, by transmitting information on the frequency of the oscillating magnetic field or the oscillating electric field generated by the power transmission unit to the first resonance frequency changing unit, the resonance frequency of the receiving antenna can be changed in the first resonance frequency changing unit so as to match the frequency of the oscillating magnetic field or the oscillating electric field.

In this configuration, the communication unit may transmit, to the first resonance frequency changing unit, the information on the frequency of the oscillating magnetic field or the oscillating electric field generated by the power transmission unit after encrypting the information.

According to the above-mentioned configuration, by transmitting information on the frequency of the oscillating magnetic field or the oscillating electric field generated by the power transmission unit to the first resonance frequency changing unit after encrypting that information, a person desiring to steal electric power can be prevented from knowing information on the frequency of the oscillating magnetic field or the oscillating electric field, thereby serving to suppress the theft of electric power.

In the configuration as described above, the frequency changing unit may make a rate of increase in the frequency larger than a rate of decrease in the frequency when changing the frequency of the oscillating magnetic field or the oscillating electric field.

According to this configuration, by making the rate of increase in frequency larger than the rate of decrease in frequency when changing the frequency of the oscillating magnetic field or the oscillating electric field, the efficiency of power reception by a person attempting to steal electric power can be considerably reduced, thereby serving to suppress the theft of electric power.

In the configuration described above, the power transmission unit may be provided with a power transmission antenna that generates the oscillating magnetic field or the oscillating electric field, and a second resonance frequency changing unit that changes a resonance frequency of the power transmission antenna according to a change in the frequency of the oscillating magnetic field or the oscillating electric field.

In the configuration described above, the electric power theft suppression unit may be configured by being provided with a detection unit that detects an oscillating magnetic field or oscillating electric field formed in the vicinity of the power transmission unit, and an electric power theft determination unit that determines whether the electric power is stolen based on a status of an oscillating magnetic field or oscillating electric field detected by the detection unit during transmission of electric power from the power transmission unit to the power reception unit.

According to this configuration, by determining whether the electric power is stolen based on the status of the oscillating magnetic field or the oscillating electric field detected by the detection unit during transmission of electric power from the power transmission unit to the power reception unit, whether the electric power is stolen can be easily detected.

In the configuration described above, an output changing unit that changes an output status of the oscillating magnetic field or the oscillating electric field emitted by the power transmission unit may be provided.

According to this configuration, by changing the output status of the oscillating magnetic field or the oscillating electric field emitted by the power transmission unit, the theft of electric power can be determined even if fluctuations in a detected oscillating magnetic field or oscillating electric field do not follow changes in the output status of the oscillating magnetic field or the oscillating electric field by detecting the oscillating magnetic field or the oscillating electric field after changing the output status of the oscillating magnetic field or the oscillating electric field.

In the configuration described above, the output changing unit may change the frequency of the oscillating magnetic field or the oscillating electric field emitted by the power transmission unit.

According to this configuration, by changing the frequency of the oscillating magnetic field or the oscillating electric field emitted by the power transmission unit, the theft of electric power can be determined when fluctuations in a detected oscillating magnetic field or oscillating electric field do not follow changes in the frequency of the oscillating magnetic field or the oscillating electric field by detecting the oscillating magnetic field or the oscillating electric field after changing the frequency of the oscillating magnetic field or the oscillating electric field.

The configuration described above may also be further provided with a notification unit that issues a notification when a theft of electric power is determined by the electric power theft determination unit.

According to this configuration, by issuing a notification when electric power has been determined to have been stolen, an administrator and the like can recognize that electric power is stolen.

The configuration described above may be further provided with an interruption unit that interrupts electric power transfer when a theft of electric power is determined by the electric power theft determination unit.

According to this configuration, by interrupting electric power transfer when electric power has been determined to have been stolen, theft of electric power can be effectively suppressed.

In a second aspect thereof, the invention relates to a transmitter of a wireless energy transfer device. This transmitter is provided with a power transmission antenna, a power transmission origination unit that generates a first oscillating magnetic field or a first oscillating electric field from the power transmission antenna, and a frequency changing unit that changes the frequency of the first oscillating magnetic field or the first oscillating electric field generated from the power transmission antenna.

In a third aspect thereof, the invention relates to a receiver of a wireless energy transfer device. This receiver is provided with a receiving antenna, a power reception unit that converts an oscillating magnetic field or an oscillating electric field received from the receiving antenna to electrical power, and a resonance frequency changing unit that changes the resonance frequency of the receiving antenna according to a change in frequency of the oscillating magnetic field or the oscillating electric field.

In a fourth aspect thereof, the invention relates to a transmitter of a wireless energy transfer device. This transmitter is provided with a power transmission antenna, a power transmission origination unit that generates a first oscillating magnetic field or a first oscillating electric field from the power transmission antenna, a detection unit that detects a second oscillating magnetic field or a second oscillating electric field formed in the vicinity of the power transmission antenna, and an electric power theft determination unit that determines whether electric power is stolen based on the status of the second oscillating magnetic field or the second oscillating electric field detected by the detection unit when generating the first oscillating magnetic field or the first oscillating electric field from the power transmission antenna.

According to the invention, the theft of wirelessly transferred energy can be suppressed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, wherein:

FIGS. 7A to 7C are explanatory drawings of changes in the frequency of an oscillating magnetic field in the wireless energy transfer device of FIG. 5; and FIGS. 8A to 8C are explanatory drawings of changes in the output of an oscillating magnetic field in the wireless energy transfer device of FIG. 5.

DETAILED DESCRIPTION OF EMBODIMENTS

The following provides a detailed explanation of first and second embodiments of the invention with reference to the appended drawings. Furthermore, like numerals denote like elements in the explanations of the drawings, and duplicate explanations are omitted.

Figure 1:
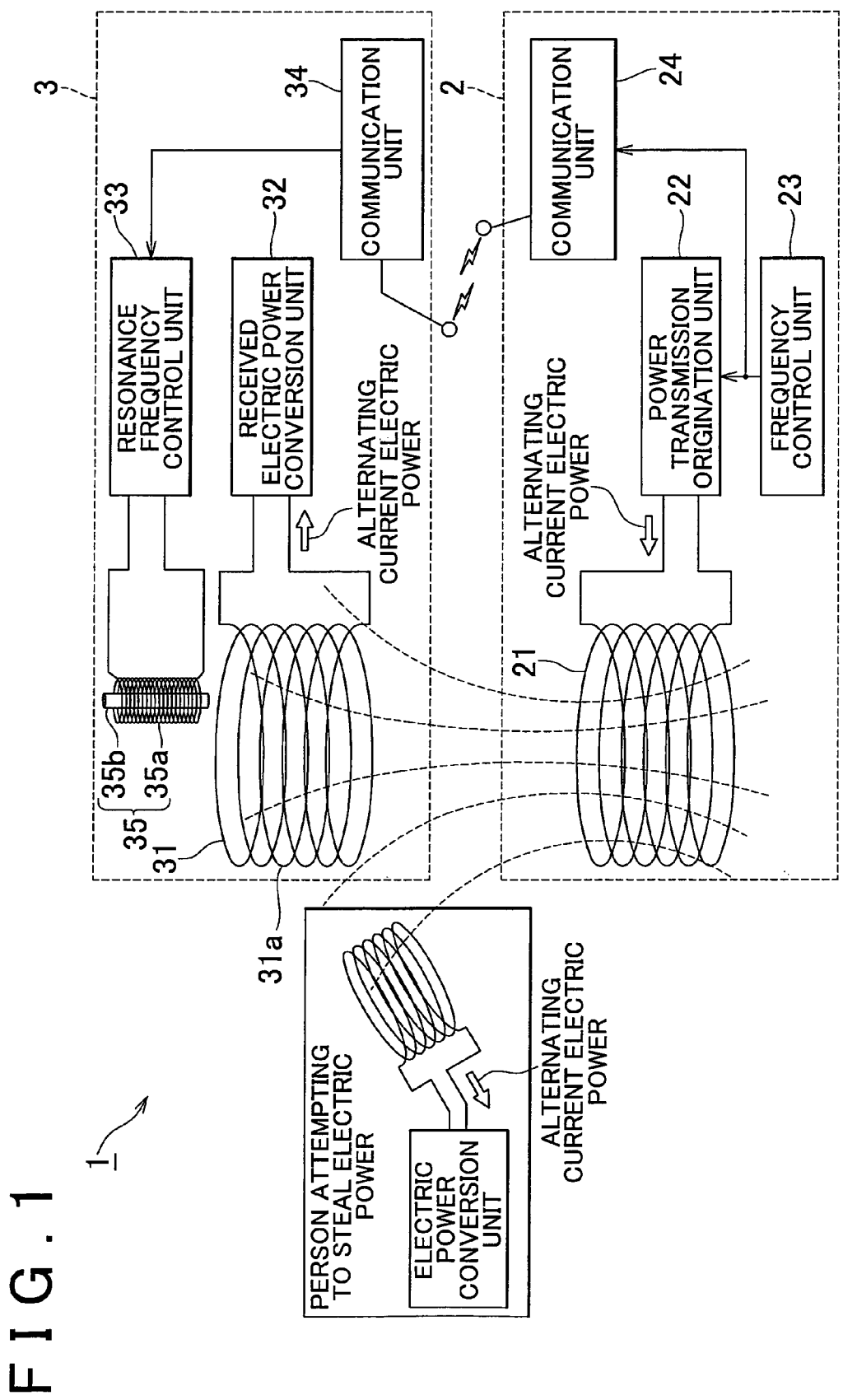
FIG. 1 is a block diagram of the configuration of a wireless energy transfer device according to a first embodiment of the invention.

FIG. 1 is a block diagram of the configuration of a wireless energy transfer device according to a first embodiment of the invention.

As shown in FIG. 1, a wireless energy transfer device 1 according to this embodiment is a device for wireless transfer of electric power energy from a power transmission unit 2 to a power reception unit 3.

The power transmission unit 2 generates an oscillating magnetic field, and is provided with a power transmission antenna 21, a power transmission origination unit 22, a frequency control unit 23, and a communication unit 24. The power transmission antenna 21 is an antenna for generating an oscillating magnetic field by inputting alternating current electric power, and a coil antenna, for examples, is used.

The power transmission origination unit 22 imparts alternating current electric power to the power transmission antenna 21, and for example, an oscillator having a variable oscillation frequency is used. The frequency control unit 23 controls the frequency of the oscillating magnetic field, and causes alternating current electric power of a frequency according to a frequency control signal to be output from the power transmission origination unit 22 by inputting the frequency control signal to the power transmission origination unit 22. In this case, the frequency control unit 23 functions as a frequency changing unit that changes the frequency of the oscillating magnetic field emitted by the power transmission unit 2.

The communication unit 24 is a communication device for communicating information with the power reception unit 3, and transmits at least information on the frequency of the oscillating magnetic field to the power reception unit 3. The transmitted information is input to a resonance frequency control unit 33 through the communication unit 34 of the power reception unit 3. Frequency information may also be transmitted after encryption. In this case, information on the changed frequency of the oscillating magnetic field can be prevented from being known to a person desiring to steal electric power, thereby serving to suppress the theft of electric power.

A communication medium of the communication unit 24 may be that which enables communication of information, and for example, a communication medium such as radio waves, light or infrared rays is used. As a result of frequency information of the oscillating magnetic field changed in the power transmission unit 2 being transmitted to the power reception unit 3 by the communication unit 24, the resonance frequency of a receiving antenna 31 in the power reception unit 3 can be matched to the frequency of the oscillating magnetic field.

The power reception unit 3 receives the oscillating magnetic field of the power transmission unit 2 and converts that oscillating magnetic field to electric power, and is provided with the receiving antenna 31, a received electric power conversion unit 32, the resonance frequency control unit 33, a communication unit 34 and a resonance frequency changing unit 35.

The receiving antenna 31 is an antenna for receiving the oscillating magnetic field of the power transmission unit 2 and converting the oscillating magnetic field to electric power, and a coil antenna, for example, is used. This receiving antenna 31 is configured to be able to change a resonance frequency, and the resonance frequency is changed to match the frequency of the oscillating magnetic field of the power transmission unit 2. In addition, the receiving antenna 31 may use the same resonance frequency as the power transmission antenna 21. The resonance frequency of the power transmission antenna 21 may be changed simultaneous to a change in the resonance frequency of the receiving antenna 31.

The received electric power conversion unit 32 inputs and converts electric power received with the receiving antenna 31, and for example, converts alternating current electric power received with the receiving antenna 31 to direct current electric power. In addition, the received electric power conversion unit 32 may also transmit an alternating current signal to the receiving antenna 31 at the same frequency as the oscillating magnetic field. In this case, transmission can be carried out by inputting frequency information from the communication unit 34.

The resonance frequency control unit 33 controls the resonance frequency of the receiving antenna 31, and functions as a resonance frequency control device that controls the resonance frequency of the receiving antenna 31 according to a change in the frequency of the oscillating magnetic field of the power transmission unit 2. This resonance frequency control unit 33 acquires information on the resonance frequency to be changed from the communication unit 34, and outputs a control signal to the resonance frequency changing unit 35 so that the resonance frequency changes to that resonance frequency.

The communication unit 34 is a communication device for communicating information with the power transmission unit 2, and receives at least information on the frequency of the oscillating magnetic field to be changed from the power transmission unit 2. When the received information signal is encrypted at this time, a communication unit is used for the communication unit 34 that is provided with a function for decrypting the encrypted information signal.

The resonance frequency changing unit 35 changes the resonance frequency of the receiving antenna 31, and functions as a resonance frequency changing device that changes the resonance frequency of the receiving antenna 31 according to a change in the frequency of the oscillating magnetic field of the power transmission unit 2. As this resonance frequency changing unit 35, a resonance frequency changing unit that changes resonance frequency by, for example, changing the inductance of the receiving antenna 31 is used. The inductance of the receiving antenna 31 is changed by arranging a coil 35a, having iron or other ferromagnetic material 35b as a core, in proximity to the receiving antenna 31, and changing the magnitude of direct current passing through the coil 35a to change the magnetic permeability of the ferromagnetic material 35b, thereby changing the inductance of the receiving antenna 31. As a result, the resonance frequency of the receiving antenna 31 can be changed. In addition, the resonance frequency may also be changed by changing the inductance of the receiving antenna 31 by applying direct current to a coil 31a of the receiving antenna 31 without using the coil 35a or ferromagnetic material 35b.

In addition, the resonance frequency changing unit 35 may also change the resonance frequency by changing the capacitance of the receiving antenna 31. For example, the resonance frequency of the receiving antenna 31 may be changed by adding a variable capacitor (not shown) to the receiving antenna 31 and changing the capacitance of the variable capacitor.

In addition, a state equivalent to the presence of a condenser or coil can be created in the received electric power conversion unit 32 by changing the current extracted following reception of electrical power in synchronization with the resonance frequency. The resonance frequency of the receiving antenna 31 may be changed as a result thereof. More specifically, a state equivalent to the presence of a condenser or coil in a resonance circuit is created by controlling current so that current entering the received electric power conversion unit 32 is shifted out of phase from voltage between the terminals thereof.

Figure 2:
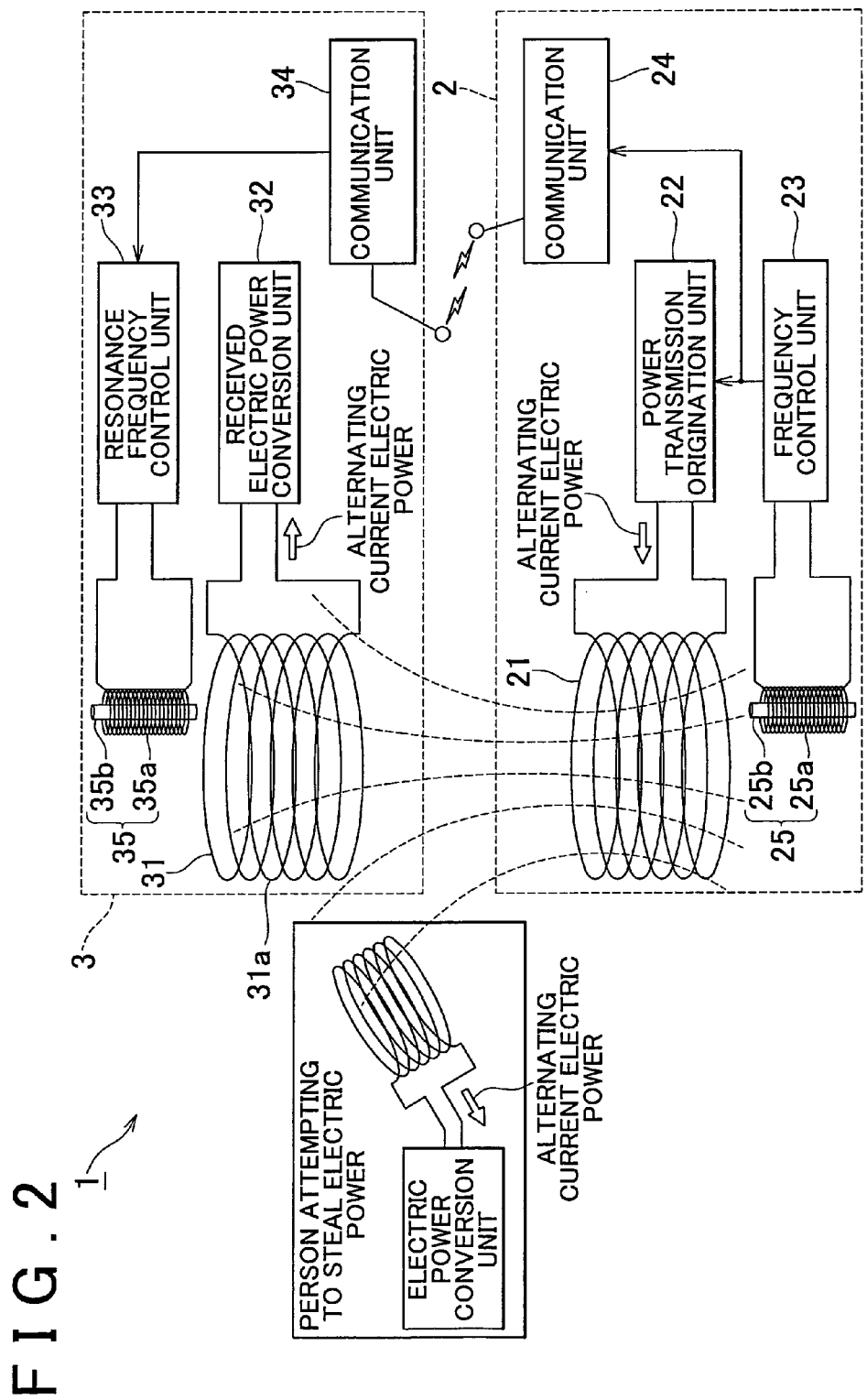
FIG. 2 is an explanatory drawing of a variation of the wireless energy transfer device in FIG. 1.

In the case of changing the resonance frequency of the power transmission antenna 21 simultaneous to changing the resonance frequency of the receiving antenna 31, as shown in FIG. 2, for example, a resonance frequency changing unit 25 may also be provided in the power transmission unit 2. This resonance frequency changing unit 25 changes the resonance frequency of the power transmission antenna 21, is configured in the same manner as the resonance frequency changing unit 35 of the power reception unit 3, and a resonance frequency changing unit, which changes resonance frequency by, for example, changing the inductance of the power transmission antenna 21, is used. The inductance of the power transmission antenna 21 is changed by arranging a coil 25a, having iron or other ferromagnetic material 25b as a core, in proximity to the power transmission antenna 21, and changing the magnitude of direct current passing through the coil 25a to change the magnetic permeability of the ferromagnetic material 25b. As a result, the resonance frequency of the power transmission antenna 21 can be changed. In addition, the resonance frequency may also be changed by changing the inductance of the power transmission antenna 21 by applying direct current to a coil 21a of the power transmission antenna 21 without using the coil 25a or ferromagnetic material 25b.

In addition, the resonance frequency changing unit 25 may also change the resonance frequency by changing the capacitance of the power transmission antenna 21. For example, the resonance frequency of the power transmission antenna 21 may be changed by adding a variable capacitor (not shown) to the power transmission antenna 21 and changing the capacitance of the variable capacitor.

The following provides an explanation of the operation of the wireless energy transfer device according to this embodiment.

Figure 3:
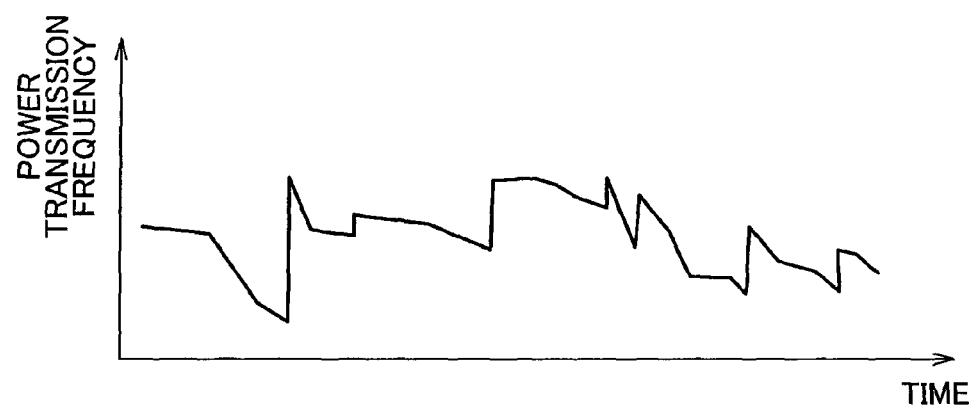
FIG. 3 is an explanatory drawing of a power transmission frequency in a wireless energy transfer device of the invention.

In FIG. 1, the frequency control unit 23 of the power transmission unit 2 outputs predetermined frequency information to the power transmission origination unit 22 and the communication unit 24. The frequency output by the frequency control unit 23 is changed with the passage of time. For example, as shown in FIG. 3, when increasing and decreasing the frequency, the rate of increase (increase rate) may be made larger than the rate of decrease (decrease rate) of the frequency. More specifically, the frequency is changed such that the frequency is gradually decreased and then increased rapidly.

Figure 4:
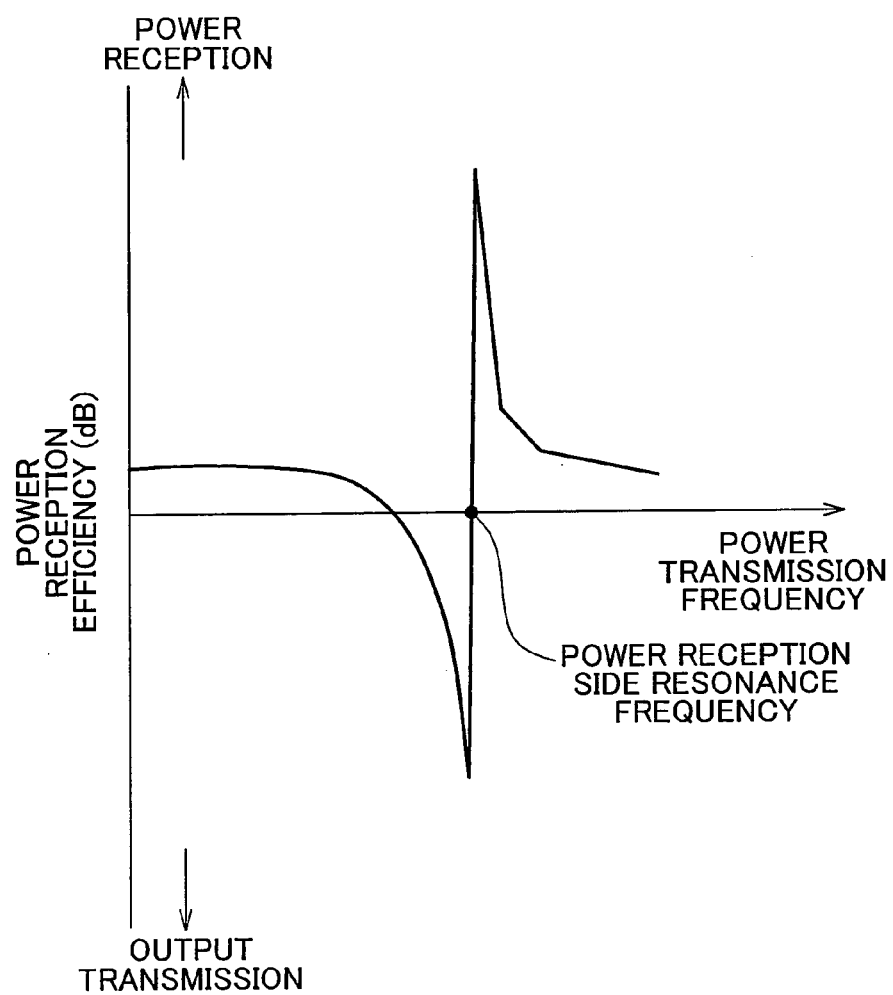
FIG. 4 is an explanatory drawing of power reception efficiency in a wireless energy transfer device of the invention.

As a result, the frequency of the oscillating magnetic field of the power transmission unit 2 can be gradually decreased and then increased rapidly, thereby making it possible to considerably reduce the power reception efficiency of a person attempting to steal electric power and suppress the theft of electrical power. Namely, as shown in FIG. 4, power reception efficiency decreases when the resonance frequency on the side of the power reception unit is low relative to the frequency of the oscillating magnetic field of the power transmission unit 2. Consequently, the power reception efficiency of a person attempting to steal electric power can be lowered by rapidly increasing the frequency of the oscillating magnetic field of the power transmission unit 2.

In addition, the frequency output by the frequency control unit 23 may also be changed randomly. For example, instead of changing the frequency only at a fixed cycle or by a fixed amount, the cycle and amount of change may be made to be random. As a result, it can be made to be difficult to steal electric power.

In FIG. 1, the power transmission origination unit 22 that has received frequency information outputs alternating current electric power according to that frequency to the power transmission antenna 21. As a result, the power transmission antenna 21 generates an oscillating magnetic field according to that frequency. The communication unit 24 that has received frequency information transmits that frequency information to the communication unit 34 of the power reception unit 3. As a result of this transmission, the power reception unit 3 is able to acquire frequency information of the oscillating magnetic field.

In the power reception unit 3, an oscillating magnetic field generated by the power transmission antenna 21 is received by the receiving antenna 31. At that time, since the resonance frequency of the receiving antenna 31 is changed so as to match the frequency of the oscillating magnetic field, the oscillating magnetic field can be efficiently received. Namely, the communication unit 34 receives frequency information and outputs that frequency information to the resonance frequency control unit 33. The resonance frequency control unit 33 outputs a control signal to the resonance frequency changing unit 35 so that the resonance frequency of the receiving antenna 31 is the same as the frequency of the frequency information. As a result, the resonance frequency of the receiving antenna 31 is changed so as to match the frequency of the oscillating magnetic field, thereby enabling efficient power reception even though the frequency of the oscillating magnetic field has been changed.

In the case of carrying out transfer of electric power from the power transmission unit 2 to the power reception unit 3 in this manner, as a result of the magnetic field formed by the power transmission unit 2 coupling by resonating in the power reception unit 3, the magnetic field can be efficiently received by the power reception unit 3 without having to be transmitted with high directivity from the power transmission unit 2, thereby enabling transfer of electric power without having to increase the energy of the magnetic field even if the power transmission unit 2 and the power reception unit 3 are separated from each other.

When transferring electric power from the power transmission unit 2 to the power reception unit 3 in this manner, even if electric power emitted by the power transmission unit 2 is attempted to be stolen by a person attempting to steal electric power, since the frequency of the oscillating magnetic field of the power transmission unit 2 is changed, the person attempting to steal electric power is unable to receive electric power efficiently.

In addition, as a result of gradually decreasing and then rapidly increasing the frequency of the oscillating magnetic field of the power transmission unit 2, a person attempting to steal electric power is unable to completely follow the resonance frequency of the antenna even if attempting to do so, and the resonance frequency of the antenna tends to be lower than the frequency of the oscillating magnetic field. Consequently, the reception efficiency of a person attempting to steal electric power can be reduced considerably thereby serving to suppress theft of electric power.

According to the wireless energy transfer device 1 of this embodiment as described above, by changing the frequency of the oscillating magnetic field generated in the power transmission unit 2, it becomes difficult to receive electric power efficiently even if the transmitted electric power is attempted to be stolen, thereby making it possible to suppress theft of electric power. In addition, by changing the resonance frequency of the receiving antenna according to a change in the frequency of the oscillating magnetic field, electric power can be received efficiently even if the frequency of the transmitted oscillating magnetic field is changed, thereby making it possible to properly transfer energy.

In addition, in the wireless energy transfer device 1 according to this embodiment, as a result of transmitting to the power reception unit 3 information on the frequency of the oscillating magnetic field to be changed by the power transmission unit 2, the resonance frequency of the receiving antenna 31 can be changed in the resonance frequency changing unit 33 so as to match the frequency of the oscillating magnetic field.

In addition, in the wireless energy transfer device 1 according to this embodiment, by transmitting to the power reception unit 3 information on the frequency of the oscillating magnetic field to be changed from the power transmission unit 2 after encrypting that information, a person attempting to steal electric power can be prevented from knowing that frequency information of the oscillating magnetic field to be changed, thereby suppressing theft of electric power.

Moreover, in the wireless energy transfer device 1 according to this embodiment, by making the rate of increase larger than the rate of decrease when increasing and decreasing the frequency of the oscillating magnetic field, the reception efficiency of a person attempting to steal electric power can be lowered considerably, thereby suppressing theft of electric power.

Furthermore, the embodiment described above indicates one example of the wireless energy transfer device according to the invention. The wireless energy transfer device according to the invention is not limited thereto, but rather the wireless energy transfer device according to this embodiment may be modified or applied to other applications without deviating from the gist thereof as described in the claims.

For example, although the description of the wireless energy transfer device according to this embodiment explained transmission of the frequency of the oscillating magnetic field from the power transmission unit 2 to the power reception unit 3 through the communication units 24 and 34, the frequency may be set in advance so that the frequency is changed, for example, at certain times in the power transmission unit 2 and the power reception unit 3, and the frequency of the oscillating magnetic field and the resonance frequency of the receiving antenna 31 may then be changed according to the setting.

In addition, although the description of the wireless energy transfer device according to this embodiment explained the case of transferring electric power with an oscillating magnetic field, an oscillating electric field may be formed by the power transmission unit 2 and electric power may be transferred with that oscillating electric field.

Figure 5:
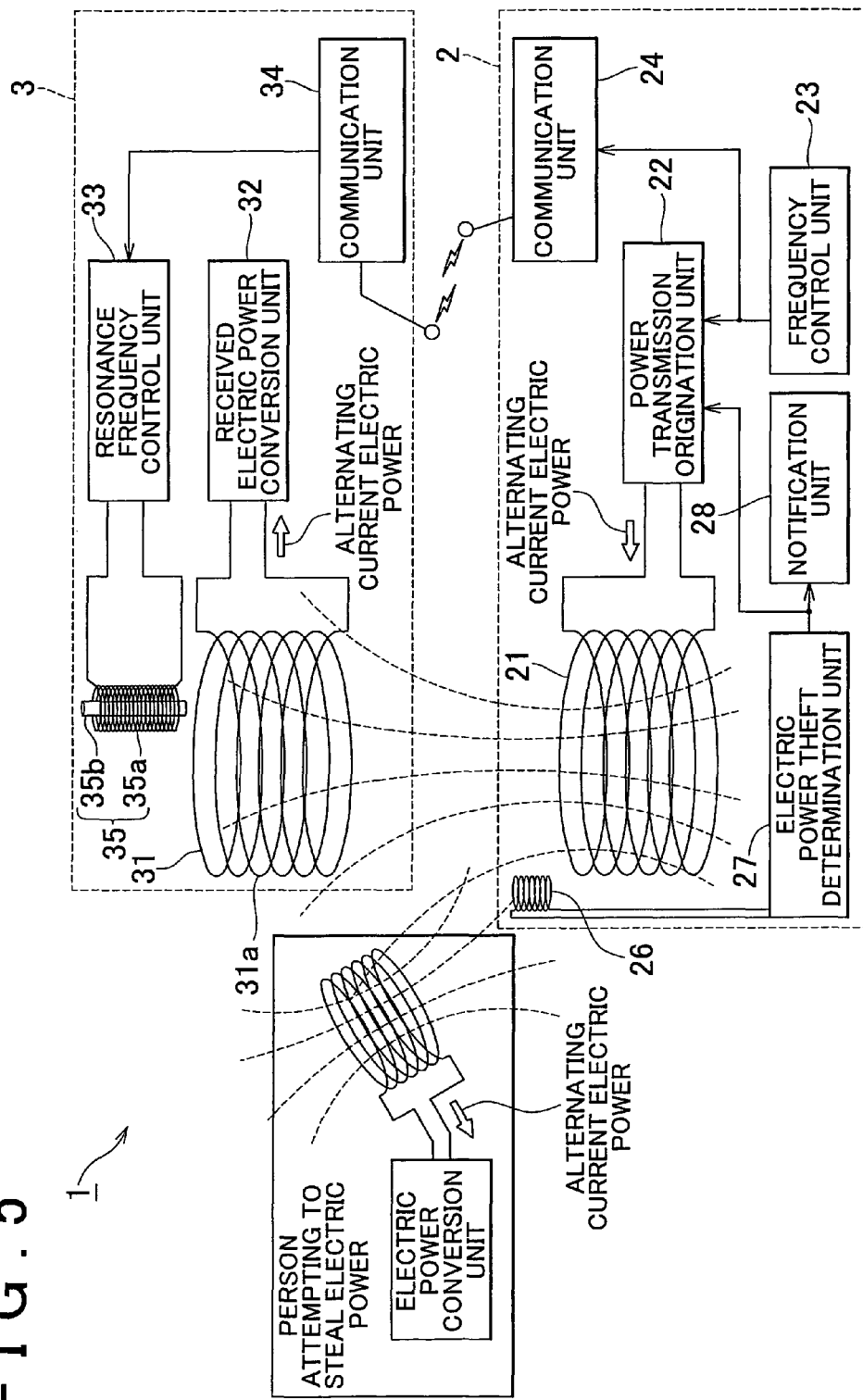
FIG. 5 is a block diagram of the configuration of a wireless energy transfer device according to a second embodiment of the invention.

FIG. 5 is a block diagram of the configuration of a wireless energy transfer device according to a second embodiment of the invention.

As shown in FIG. 5, the wireless energy transfer device 1 is a device for wirelessly transferring electric power energy from a power transmission unit 2 to a power reception unit 3 in the same manner as the first embodiment.

In addition, differing from the power transmission unit 2 according to the first embodiment, the power transmission unit 2 according to this embodiment is provided with a detection unit 26, an electric power theft determination unit 27, and a notification unit 28. The detection unit 26 functions as a detection device for detecting an oscillating magnetic field formed in the vicinity of the power transmission unit 2, and is composed of a coil, for example. This detection unit 26 is installed, for example, at a location at a predetermined distance from the power transmission antenna 21. As a result, an oscillating magnetic field emitted by an electric power receiver of a person attempting to steal electric power and the oscillating magnetic field emitted by the power transmission unit 2 can be detected by the detection unit 26.

The electric power theft determination unit 27 functions as an electric power theft determination device for determining whether or not electric power is stolen based on the status of the oscillating magnetic field according to the detection unit 26, and is composed of, for example, a detection signal analyzing device. The notification unit 28 notifies a user or administrator of the wireless energy transfer device that electric power is stolen when it has been determined by the electric power theft determination unit 27 that electric power is stolen. The notification method employed by the notification unit 28 may be, for example, notifying with a voice, buzzer or other auditory notification, or notifying with illuminated lights or flashing lights on a monitor display, lamps or other visual notification.

In addition, transfer of electric power may be interrupted when it has been determined by the electric power theft determination unit 27 that electric power is stolen. For example, when it has been determined by the electric power theft determination unit 27 that electric power is stolen, an electric power theft detection signal is output to the power transmission origination unit 22, and the transfer of electric power is interrupted by interrupting the output of alternating current electric power in the power transmission origination unit 22. In this case, since transfer of electric power is interrupted immediately when electric power is stolen, theft of electric power can be effectively suppressed.

In addition, the wireless energy transfer device 1 may also be provided with the frequency control unit 23 and the communication unit 24. In this case, the frequency control unit 23 functions as a frequency changing unit that changes the frequency of the oscillating magnetic field emitted by the power transmission unit 2. By changing the frequency of the oscillating magnetic field for transmitting electric power, it becomes difficult to receive electric power by stealing electric power, thereby serving to suppress theft of electric power.

Furthermore, the devices of the frequency control unit 23 and the communication unit 24 may be omitted in this embodiment.

The power reception unit 3 according to this embodiment receives the oscillating magnetic field of the power transmission unit 2 and converts that oscillating magnetic field to electric power in the same manner as the first embodiment, and is provided with the receiving antenna 31, the received electric power conversion unit 32, the resonance frequency control unit 33, the communication unit 34 and the resonance frequency changing unit 35.

Figure 6:
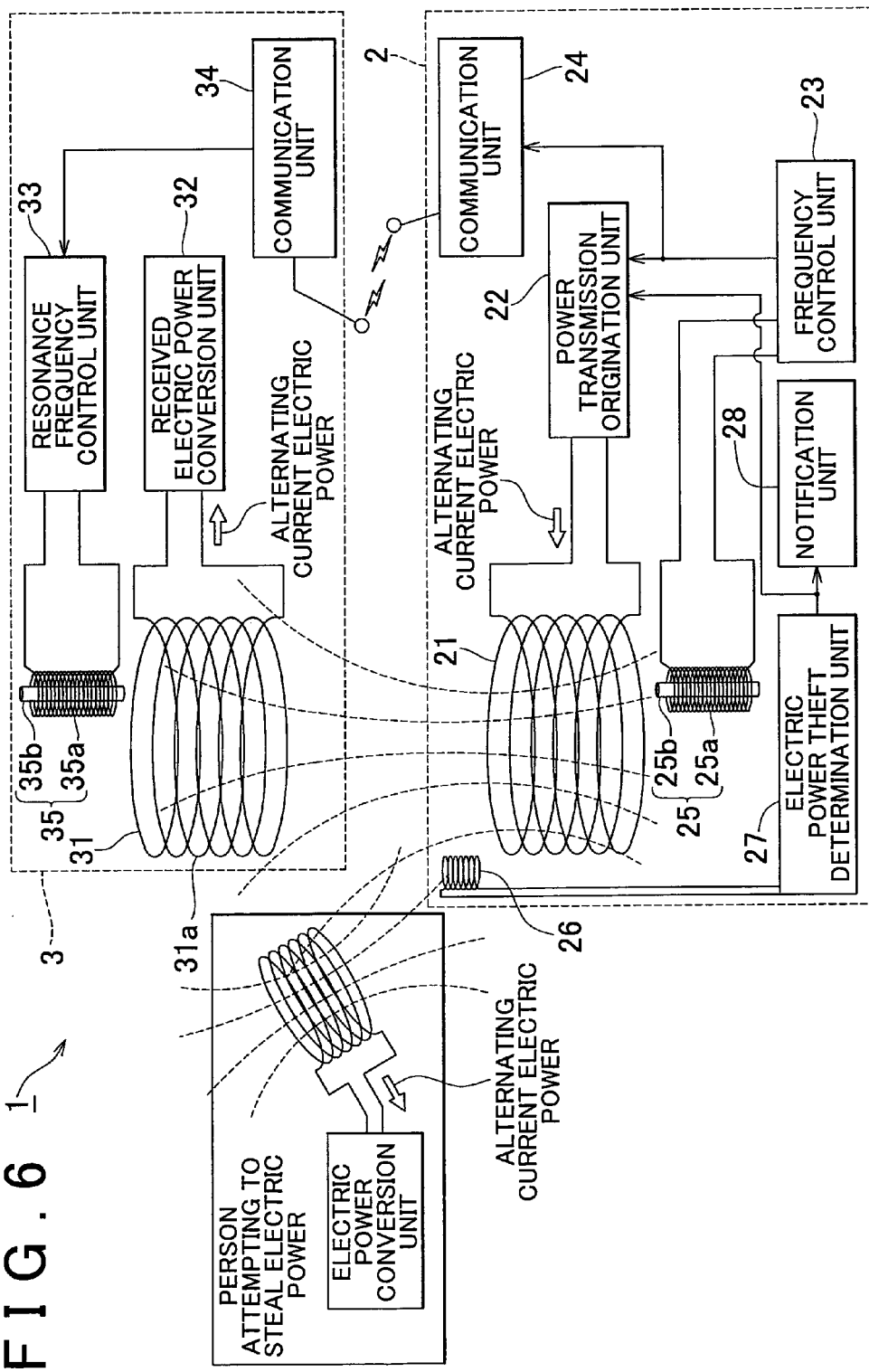
FIG. 6 is an explanatory drawing of a variation of the wireless energy transfer device of FIG. 5.

In the case of changing the resonance frequency of the power transmission antenna 21 simultaneous to changing the resonance frequency of the receiving antenna 31, the resonance frequency changing unit 25 may be provided in the power transmission unit 2 as shown in FIG. 6 in this embodiment as well in the same manner as the first embodiment.

Furthermore, in the power reception unit 3, the resonance frequency control unit 33, the devices of the communication unit 34, and the resonance frequency changing unit 35 may be omitted in the case of receiving electric power without changing the resonance frequency. In that case, the device of the resonance frequency changing unit 25 of the power transmission unit 2 is also omitted.

Next, an explanation is provided of the operation of the wireless energy transfer device 1 according to this embodiment.

In FIG. 5, the power transmission origination unit 22 first outputs alternating electric power at a predetermined frequency to the power transmission antenna 21. The power transmission antenna 21 then generates an oscillating magnetic field according to that frequency. The frequency of the alternating current output from the power transmission origination unit 22 is set according to a frequency control signal output from the frequency control unit 23.

At this time, although the frequency of the alternating current may be constant, it may also be made to change with the passage of time. Changing the frequency of the oscillating magnetic field makes it difficult to steal electric power, thereby serving to suppress electric power theft. For example, as shown in FIG. 3, the frequency of the oscillating magnetic field may be changed by increasing and decreasing that frequency. In addition, the rate of increase (increase rate) may also be made larger than the rate of decrease (decrease rate) of the frequency. In other words, the frequency may be changed such that the frequency is gradually decreased and then increased rapidly.

As a result, the frequency of the oscillating magnetic field of the power transmission unit 2 can be changed by gradually decreasing and then increasing rapidly, thereby making it possible to considerably reduce the power reception efficiency of a person attempting to steal electric power and suppress the theft of electrical power. As shown in FIG. 4, power reception efficiency decreases when the resonance frequency of the power reception unit is low relative to the frequency of the oscillating magnetic field of the power transmission unit 2. Consequently, the power reception efficiency of a person attempting to steal electric power can be lowered as a result of lowering the power reception frequency of that person by rapidly increasing the frequency of the oscillating magnetic field of the power transmission unit 2.

In FIG. 5, the frequency control unit 23 also outputs a frequency control signal to the communication unit 24 together with outputting a frequency control signal to the power transmission origination unit. 22. The communication unit 24 that has received the frequency control signal transmits frequency information thereof to the communication unit 34 of the power reception unit 3. As a result of that transmission, the power reception unit 3 is able to acquire frequency information on the oscillating magnetic field.

In the power reception unit 3, the oscillating magnetic field emitted by the power transmission antenna 21 is received by the receiving antenna 31. At that time, since the resonance frequency of the receiving antenna 31 is changed so as to match the frequency of the oscillating magnetic field, the oscillating magnetic field can be received efficiently. Namely, frequency information is received by the communication unit 34 and that frequency information is then output to the resonance frequency control unit 33. The resonance frequency control unit 33 then outputs a control signal to the resonance frequency changing unit 35 so that the resonance frequency of the receiving antenna 31 is the same as the frequency of the frequency information. As a result, the resonance frequency of the receiving antenna 31 is changed so as to match the frequency of the oscillating magnetic field, and reception can be carried out efficiently even though the frequency of the oscillating magnetic field has been changed.

In the case of transferring electric power from the power transmission unit 2 to the power reception unit 3 in this manner, as a result of the magnetic field formed by the power transmission unit 2 coupling by resonating in the power reception unit 3, the magnetic field can be efficiently received by the power reception unit 3 without having to be transmitted with high directivity from the power transmission unit 2, thereby enabling transfer of electric power without having to increase the energy of the magnetic field even if the power transmission unit 2 and the power reception unit 3 are separated from each other.

Here, the detection unit 26 detects an oscillating magnetic field formed in the vicinity of the power transmission unit 2 when electric power is transferred from the power transmission unit 2 to the power reception unit 3. The oscillating magnetic field detected by the detection unit 26 is then input to the electric power theft determination unit 27. The electric power theft determination unit 27 determines whether or not electric power to be transferred is stolen based on the status of the oscillating magnetic field.

For example, the electric field theft determination unit 27 stores in memory a waveform of the oscillating magnetic field during ordinary transfer of electric power that is not being attempted to be stolen, compares a waveform of the oscillating magnetic field detected at the time of detection with the ordinary waveform, and determines that electric power is stolen when the waveform of the detected oscillating magnetic field differs in amplitude or phase by a predetermined value or more from the ordinary waveform.

In addition, at this time, the electric power theft determination unit 27 may also change the frequency of the oscillating magnetic field formed by the power transmission unit 2 and then determine whether or not electric power is stolen based on the status of the detected oscillating magnetic field after that frequency change. For example, if the frequency of the oscillating magnetic field during transmission and reception of electrical power between the power transmission unit 2 and the power reception unit 3 is changed as shown in FIG. 7A, the oscillating magnetic field emitted from an electric power receiver of a person attempting to steal electric power is unable to follow the change in frequency as shown in FIG. 7B. Consequently, the oscillating magnetic field detected by the detection unit 26 appears in the manner of a superposition of multiple oscillating magnetic fields having different frequencies as shown in FIG. 7C, thereby causing amplitude and the like to differ from that during ordinary power transmission and reception. Thus, the electric power theft determination unit 27 is able to determine the theft of electric power based on differences in this waveform.

In addition, the electric power theft determination unit 27 may also change the output of the oscillating magnetic field formed by the power transmission unit 2 and then determine whether or not electric power is stolen based on the status of a detected oscillating magnetic field after that change in output. For example, if the output of the oscillating magnetic field during transmission and reception of electrical power between the power transmission unit 2 and the power reception unit 3 is decreased as shown in FIG. 8A, the oscillating magnetic field emitted from an electric power receiver of a person attempting to steal electric power is unable to follow the change in output as shown in FIG. 8B. Consequently, the oscillating magnetic field detected by the detection unit 26 appears to have a larger output than the output status of the oscillating magnetic field during transmission and reception of electric power between the power transmission unit 2 and the power reception unit 3. Thus, the electric power theft determination unit 27 is able to determine the theft of electric power based on the amplitude of this oscillating magnetic field.

In FIG. 5, when it has been determined by the electric power theft determination unit 27 that electric power is stolen, a user or administrator of the wireless energy transfer device 1 is notified to that effect by the notification unit 28. In addition, transfer of electric power may also be interrupted when it has been determined by the electric power theft determination unit 27 that electric power is stolen. For example, transfer of electric power is interrupted by an electric power theft detection signal being output from the electric power theft determination 27 to the power transmission origination unit 22 followed by interruption of the output of alternating current electric power in the power transmission origination unit 22. As a result, since transfer of electric power is interrupted immediately when electric power is stolen, electric power theft can be effectively suppressed.

According to the wireless energy transfer device 1 of this embodiment as described above, by determining whether or not electrical power is stolen based on the status of an oscillating magnetic field detected by the detection unit 26 during transfer of electric power from the power transmission unit 2 to the power reception unit 3, whether or not electric power is stolen can be easily determined. In this case, since theft of electric power is detected based on the status of an oscillating magnetic field, theft of electric power can be detected without having to detect the presence of a person attempting to steal electric power or an electric power receiver of a person attempting to steal electric power and the like.

In addition, by changing the output status of the oscillating magnetic field emitted by the power transmission unit 2, whether or not electric power is stolen can be determined when fluctuations in a detected oscillating magnetic field or oscillating electric field do not follow the change in output of the oscillating magnetic field by detecting an oscillating magnetic field after changing the output status of the oscillating magnetic field.

In addition, by changing the frequency of the oscillating magnetic field emitted by the power transmission unit 2, whether or not electric power is stolen can be determined when fluctuations in a detected oscillating magnetic field do not follow the change in frequency of the oscillating magnetic field by detecting an oscillating magnetic field after changing the frequency of the oscillating magnetic field.

In addition, by issuing a notification when theft of electric power has been determined, an administrator and the like can be allowed to recognize that electric power is stolen.

Moreover, by interrupting transfer of electric power when theft of electric power has been determined, theft of electric power can be effectively suppressed.

Furthermore, the embodiment described above indicates one example of the wireless energy transfer device according to the invention. The wireless energy transfer device according to the invention is not limited thereto, but rather the wireless energy transfer device according to this embodiment may be modified or applied to other applications without deviating from the gist thereof as described in the claims.

For example, although the description of the wireless energy transfer device according to this embodiment explained transmission of the frequency of the oscillating magnetic field from the power transmission unit 2 to the power reception unit 3 through the communication units 24 and 34, the frequency may be set in advance so that the frequency is changed, for example, at certain times in the power transmission unit 2 and the power reception unit 3, and the frequency of the oscillating magnetic field and the resonance frequency of the receiving antenna 31 may then be changed according to the setting.

In addition, although the description of the wireless energy transfer device according to this embodiment explained the case of transferring electric power with an oscillating magnetic field, an oscillating electric field may be formed by the power transmission unit 2 and electric power may be transferred with that oscillating electric field.

The invention claimed is:

1. A wireless energy transfer device, comprising:
   a power transmission unit that generates an oscillating magnetic field or an oscillating electric field;
   a power reception unit, which is provided with a receiving antenna, and which converts the oscillating magnetic field or the oscillating electric field of the power transmission unit to electric power with the receiving antenna; and
   an electric power theft suppression unit that suppresses a theft of energy with the oscillating magnetic field or the oscillating electric field generated by the power transmission unit, wherein
   the electric power theft suppression unit comprises:
      a frequency changing unit that changes a frequency of the oscillating magnetic field or the oscillating electric field generated by the power transmission unit,
      a first resonance frequency changing unit that changes a resonance frequency of the receiving antenna according to the change in the frequency of the oscillating magnetic field or the oscillating electric field,
      a detection unit that detects a second oscillating magnetic field or a second oscillating electric field formed in a vicinity of the power transmission unit, and
      an electric power theft determination unit that determines whether the electric power is stolen based on a status of the second oscillating magnetic field or a status of the second oscillating electric field detected by the detection unit during transmission of the electric power from the power transmission unit to the power reception unit.

2. The wireless energy transfer device according to claim 1, further comprising a communication unit that transmits information on the frequency of the oscillating magnetic field or the oscillating electric field generated by the power transmission unit to the first resonance frequency changing unit.

3. The wireless energy transfer device according to claim 2, wherein the communication unit transmits, to the first resonance frequency changing unit, the information on the frequency of the oscillating magnetic field or the oscillating electric field generated by the power transmission unit after encrypting the information.

4. The wireless energy transfer device according to claim 1, wherein the frequency changing unit makes a rate of increase in the frequency larger than a rate of decrease in the frequency when changing the frequency of the oscillating magnetic field or the oscillating electric field.

5. The wireless energy transfer device according to claim 1, wherein the power transmission unit comprises: a power transmission antenna that generates the oscillating magnetic field or the oscillating electric field; and a second resonance frequency changing unit that changes a resonance frequency of the power transmission antenna according to a change in the frequency of the oscillating magnetic field or the oscillating electric field.

6. The wireless energy transfer device according to claim 1, further comprising an output changing unit that changes an amplitude of the oscillating magnetic field or the oscillating electric field emitted by the power transmission unit.

7. The wireless energy transfer device according to claim 1, further comprising a notification unit that issues a notification when a theft of electric power is determined by the electric power theft determination unit.

8. The wireless energy transfer device according to claim 1, further comprising an interruption unit that interrupts electric power transfer when theft of electric power is determined by the electric power theft determination unit.

9. The wireless energy transfer device according to claim 8, wherein the interruption unit interrupts generation of the oscillating magnetic field or the oscillating electric field in the power transmission unit.

\* \* \* \* \*